(12) United States Patent
Lai et al.

(10) Patent No.: US 10,491,018 B2
(45) Date of Patent: Nov. 26, 2019

(54) POWER OUTPUT MANAGEMENT APPARATUS OF BATTERY AND MANAGMENT METHOD THEREOF

(71) Applicants: LITE-ON ELECTRONICS (GUANGZHOU) LIMITED, Guangzhou (CN); Lite-On Technology Corporation, Taipei (TW)

(72) Inventors: Wei-Lieh Lai, Taipei (TW); Chang-Yuan Liu, Taipei (TW); Chieh-Fu Hsiao, Taipei (TW); Yi-Pin Lee, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 288 days.

(21) Appl. No.: 15/296,048

(22) Filed: Oct. 18, 2016

(65) Prior Publication Data

US 2018/0048171 A1  Feb. 15, 2018

(30) Foreign Application Priority Data

Aug. 15, 2016  (CN) .......................... 2016 1 0669809

(51) Int. Cl.
H02J 7/00 (2006.01)

(52) U.S. Cl.
CPC .......... *H02J 7/0052* (2013.01); *H02J 7/0068* (2013.01)

(58) Field of Classification Search
USPC ................ 320/128, 134, 166, 167, 136, 132
See application file for complete search history.

(56) References Cited

U.S. PATENT DOCUMENTS

| | | | |
|---|---|---|---|
| 2013/0154579 A1* | 6/2013 | Morita | H02J 7/00 320/166 |
| 2013/0249446 A1* | 9/2013 | Kumagai | B60L 11/1859 318/139 |
| 2015/0021989 A1* | 1/2015 | Lin | H02J 9/06 307/23 |
| 2015/0022156 A1* | 1/2015 | Lin | H02J 1/10 320/134 |
| 2017/0117734 A1* | 4/2017 | Lai | H02J 9/061 |

* cited by examiner

*Primary Examiner* — Alexis B Pacheco
(74) *Attorney, Agent, or Firm* — JCIPRNET (57) ABSTRACT

A power output management apparatus of a battery and a management method thereof are provided. The management method includes: enabling a power output mode and discharging a battery to a load via a discharge circuit in the power output mode; calculating the output power of the discharge circuit during the discharge; comparing the output power and a target power to generate a comparison result; and setting the output power being adjusted step by step by a unit compensation amount via the discharge circuit according to the comparison result.

18 Claims, 6 Drawing Sheets

POWER OUTPUT MANAGEMENT APPARATUS OF BATTERY AND MANAGMENT METHOD THEREOF

CROSS-REFERENCE TO RELATED APPLICATION

This application claims the priority benefit of China application no. 201610669809.2, filed on Aug. 15, 2016. The entirety of the above-mentioned patent application is hereby incorporated by reference herein and made a part of this specification.

BACKGROUND OF THE INVENTION

Field of the Invention

The invention relates to a power output management apparatus of a battery and a management method thereof, and more particularly, to a power output management apparatus of a battery adjusting output power via adaptation and a management method thereof.

Description of Related Art

In the field of modern technology, a general lithium battery management system uses the open-circuit voltage as the basis for the estimation of the initial capacity of a battery. However, based on the electrochemical properties of the battery, the state of battery capacity decline is hard to learn. In prior art, after a plurality of charge-discharge cycles is formed for the battery, one estimation of an open-circuit voltage curve can be performed. The estimation of the battery initial capacity is performed via the open-circuit voltage curve. This estimation result often produces error in battery capacity due to the battery capacity decline.

To solve the issue of estimation error, the prior art adopts a method of battery learning and estimates the capacity decline by comparing the difference in battery charge-discharge Ampere-hour (AH). After the method is applied and used in the battery for a certain period, battery learning is performed to correct the size of remaining capacity. In prior art, when the battery is learning, the system needs to shut down due to the learning, and therefore the work efficiency of the system is reduced.

SUMMARY OF THE INVENTION

The invention provides a battery management apparatus and a battery power output management method to effectively control the power output benefit of a battery.

The power output management method of a battery of the invention includes: enabling a power output mode and discharging a battery to a load via a discharge circuit in the power output mode; calculating an output power of the discharge circuit during the discharge; comparing the output power and a target power to generate a comparison result; and adjusting the output power step by step via the discharge circuit according to a unit compensation amount and the comparison result.

The battery management apparatus of the invention includes a battery, a discharge circuit, and a controller. The discharge circuit is coupled to the battery and coupled to a DC bus, the DC bus is coupled to a load, and the discharge circuit discharges the battery to the load in a power output mode. The controller is coupled to the discharge circuit, the controller calculates the output power of the discharge circuit during the discharge and compares the output power and a target power to generate a comparison result, and adjusts the output power step by step via the discharge circuit according to a unit compensation amount and the comparison result.

Based on the above, in the invention, by adjusting the output power of the discharge circuit step by step during discharge, the output power of the discharge circuit can meet system requirements. As a result, the DC bus in an embodiment of the invention can receive power supplied by the battery and another external DC power at the same time without sharing current by backing up each other, and therefore the stability of the power supply is increased.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
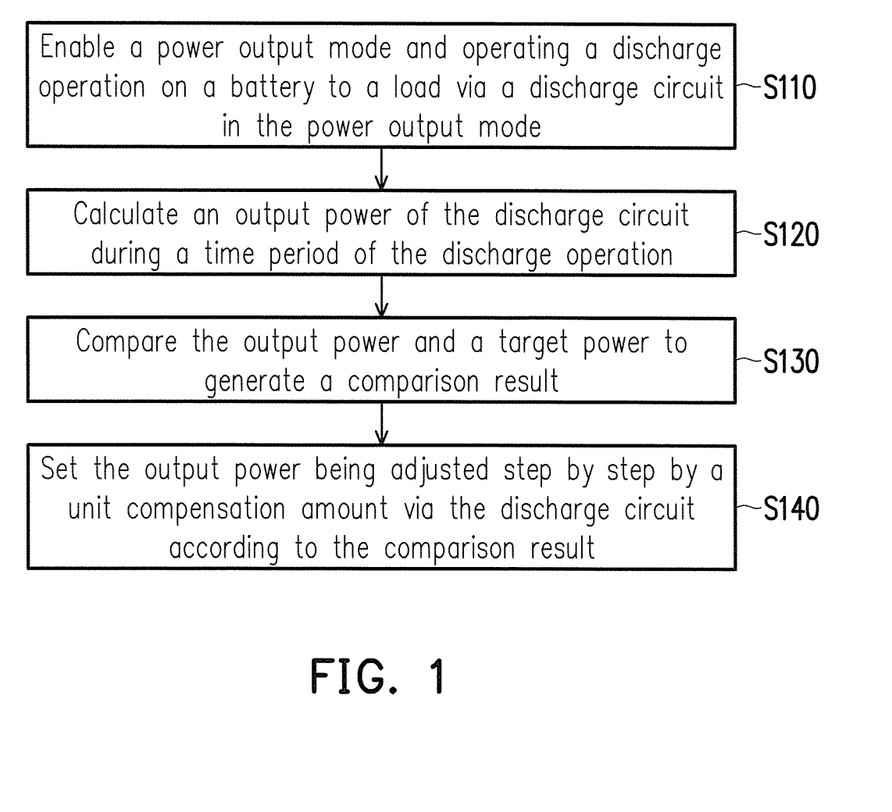
FIG. 1 shows a flow chart of a power output management method of a battery of an embodiment of the invention.

Referring to FIG. 1, FIG. 1 shows a flow chart of a power output management method of a battery of an embodiment of the invention. In step S110, a power output mode of a battery is enabled, and a discharge operation is operated on a battery to a load via a discharge circuit in the power output mode. Moreover, in step S120, during a time period of the discharge operation, the output power of the discharge circuit is calculated. Next, step S130 is performed to compare the calculated output power and a target power and accordingly generate a comparison result. Then, in step S140, the discharge circuit sets the output power being adjusted step by step by a unit compensation amount via the discharge circuit according to the comparison result, wherein, the unit compensation amount and the comparison result are generated in step S130.

In detail, in the power output management method of the invention, before entering the power output mode, whether the storage capacity of the battery is greater than a first preset value can be first determined, and whether the battery is in a discharged state at this point is determined. If the storage capacity of the battery is detected to be greater than the first preset value and the battery is not in the discharged state at this point, then the battery can enter the power output mode. In contrast, if the storage capacity of the battery is not greater than the first preset value and/or the battery is in the discharged state, then the battery cannot enter the power output mode.

It should be mentioned that, the power output mode can also be a battery learning mode, and can also be a normal power supply mode for driving the battery. Moreover, the first preset value can be 98% of the total storage capacity of the battery.

Moreover, in step S120, during the discharge operation, the output voltage and the output current generated by the discharge circuit can be sampled, and the output voltage and the output current can be computed to obtain the output power provided by the discharge circuit (equal to about the output power of the battery at this point).

The output power obtained in step S120 is compared with the target power set in step S130 and the difference of the output power and the target power is calculated. The unit compensation amount can be set according to the calculated difference of the output power and the target power. In particular, the unit compensation amount can be direct proportion to the difference of the output power and the target power. For instance, if the difference of the output power and the target power is 100 W, then the unit compensation amount can be set to 50 W, and if the difference of the output power and the target power is 50 W, then the unit compensation amount can be set to 15 W.

Moreover, the target power is not necessarily a fixed value. The target power can be dynamically adjusted according to load requirements.

In step S140, when the difference is greater than a critical difference, the output power of the discharge circuit is adjusted. In particular, the adjustment of the output power in an embodiment of the invention is not a compensation occurring in one step. In an embodiment of the invention, the output power can be increased or decreased step by step according to the unit compensation amount and accordingly reduce the occurrence of ripples. Moreover, the unit compensation amount can be set according to the size of the difference, wherein when the difference is greater, the set unit compensation amount is greater, and when the difference is smaller, the set unit compensation amount is smaller. As a result, the adjustment speed of the output power can also be taken into account.

Figure 2A:
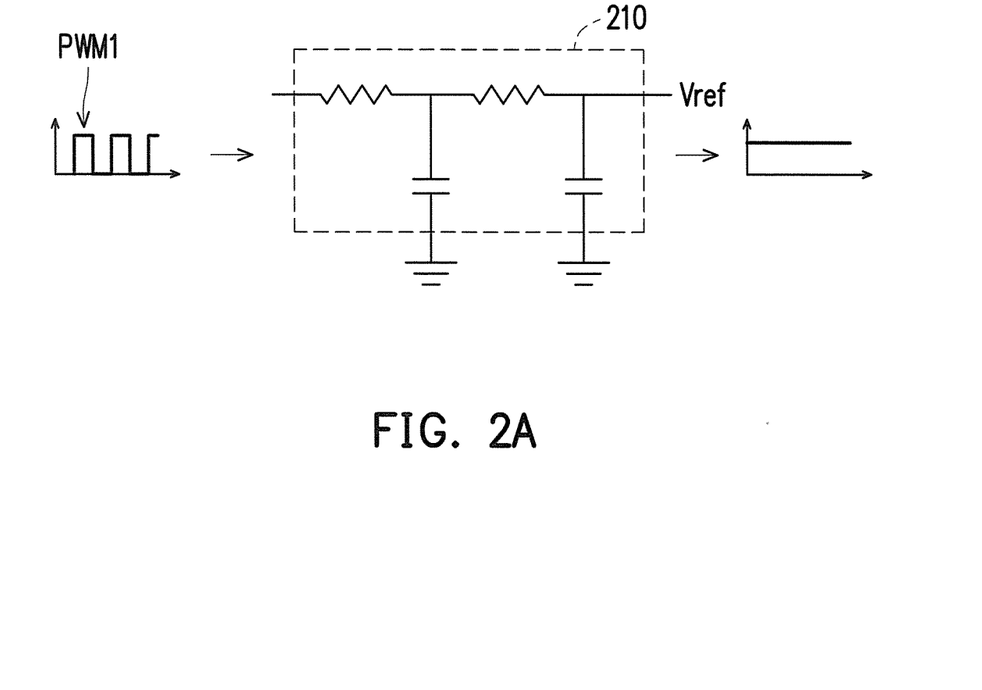
FIG. 2A shows a schematic of an output power adjustment method of an embodiment of the invention.

It should be mentioned that, the adjustment method of the output power can be performed in a digital manner. Referring to both FIG. 1 and FIG. 2A, FIG. 2A shows a schematic of an output power adjustment method of an embodiment of the invention. In the present embodiment, the output power of the discharge circuit can be controlled according to one pulse-width modulation signal PWM1. In particular, the pulse-width modulation signal PWM1 can be inputted to a filter 210. The filter 210 generates a reference voltage Vref corresponding to the pulse-width modulation signal PWM1. By sending the reference voltage Vref to the discharge circuit, the discharge circuit can adjust the size of the output power according to the voltage level of the reference voltage Vref.

Figure 2B:
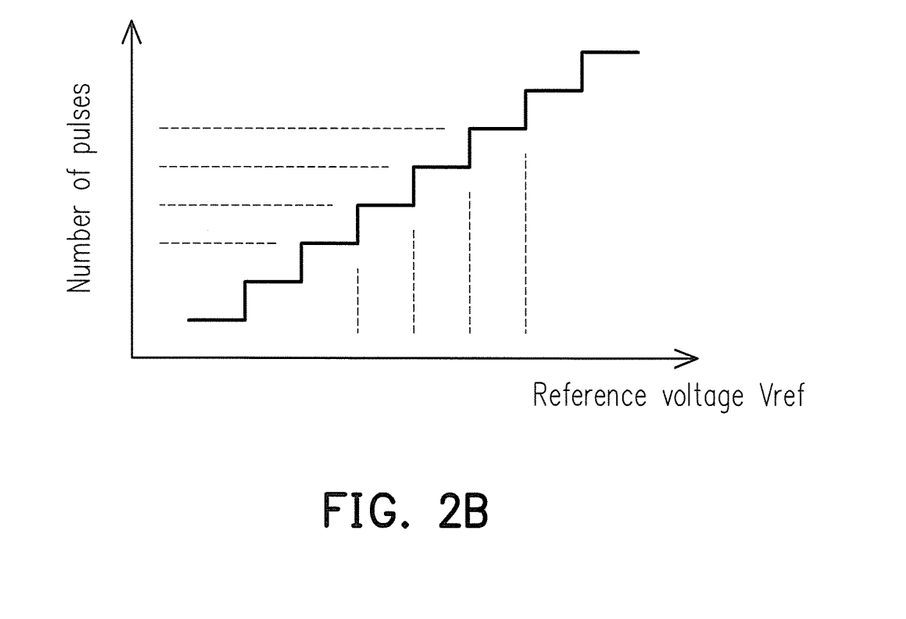
FIG. 2B shows the relationship between number of pulses and reference voltage.

When the output power of the discharge circuit is to be adjusted step by step, the number of pulses in the unit time of the pulse-width modulation signal PWM1 can be increased or decreased according to the set unit compensation amount. It can be known from the relationship of the number of pulses and the reference voltage Vref shown in FIG. 2B that, when the number of pulses in the unit time of the pulse-width modulation signal PWM1 is increased, the voltage value of the reference voltage Vref can be correspondingly increased, and at the same time, the output power of the discharge circuit can be increased according to the increased reference voltage Vref. In contrast, when the number of pulses in the unit time of the pulse-width modulation signal PWM1 is reduced, the voltage value of the reference voltage Vref can be correspondingly reduced, and at the same time, the output power of the discharge circuit can be reduced according to the reference voltage Vref.

Figure 3:
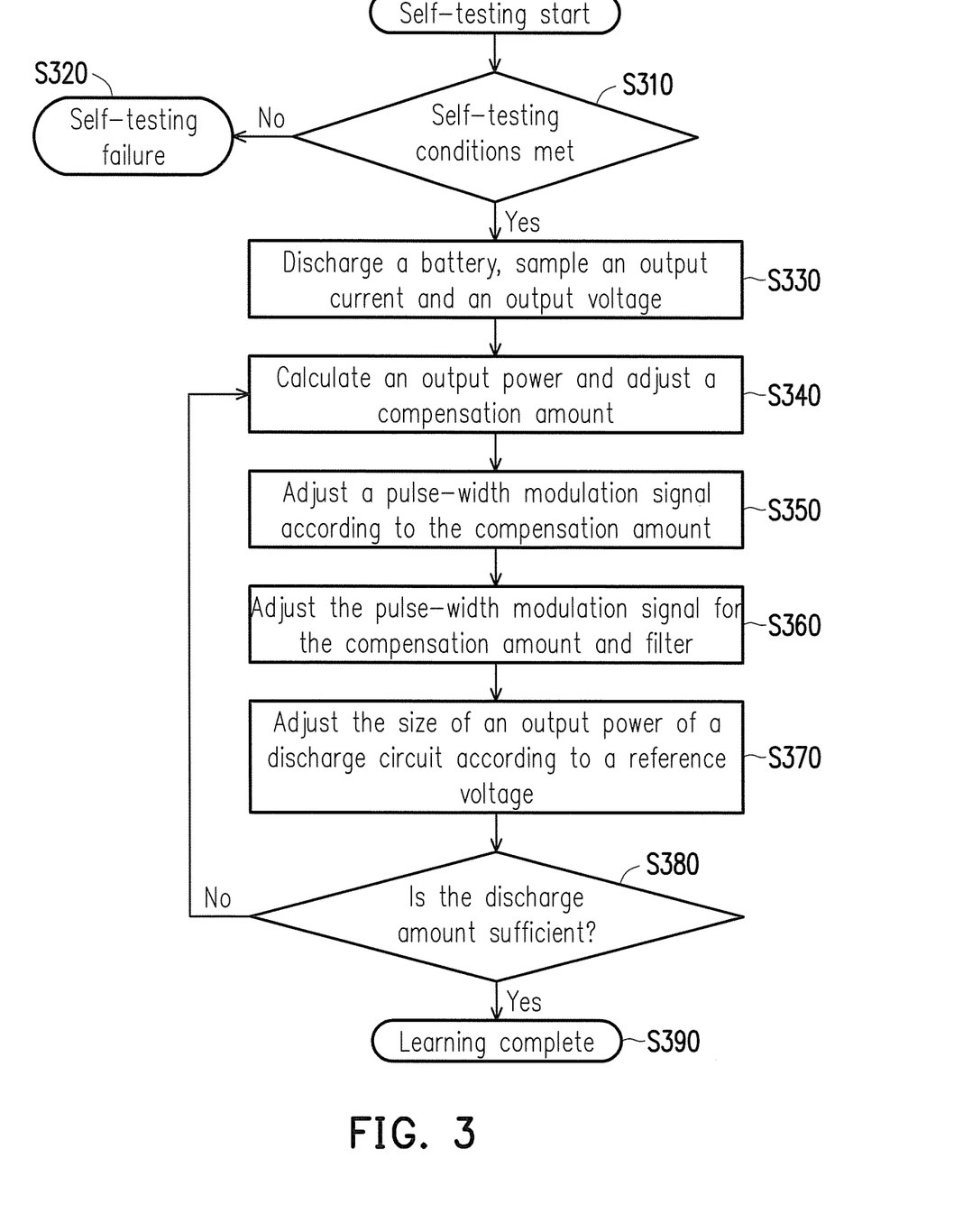
FIG. 3 shows a flow chart of a learning mode of a battery of an embodiment of the invention.

The power output mode of the above embodiments can be a battery learning mode. Accordingly, FIG. 3 shows a flow chart of a battery learning mode of an embodiment of the invention. In particular, after the learning is started, step S310 can detect whether the battery can currently meet the learning conditions. In particular, step S310 can detect whether the storage capacity of the battery is greater than a first preset value and whether the battery is currently in a discharged state. If the test result shows that the storage capacity of the battery is greater than the first preset value and the battery is not in the discharged state, then the battery currently meets the learning conditions, and step S330 can be performed. On the other hand, if the storage capacity of the battery is not greater than the first preset value and/or the battery is currently in the discharged state, then the battery does not meet the learning conditions, and step S320 is performed to show learning failure.

Next, step S330 is performed to discharge the battery. In particular, the battery is discharged to a load via a discharge circuit, and the output voltage and the output current generated by the discharge circuit at this point are sampled at the same time. Step S340 calculates the output voltage and the output current and obtains an output power. The compensation amount is adjusted according to the output power. Here, the compensation amount can be the unit compensation amount in the above embodiments, and the size of the unit compensation amount can be adjusted according to the difference of the output power and a target power.

In step S340, the pulse-width modulation signal is adjusted according to the compensation amount, and the pulse-width modulation signal is filtered to generate a reference voltage. The adjustment of the pulse-width modulation signal according to the compensation amount can include increasing or decreasing the number of pulses in the unit time of the pulse-width modulation signal according to the compensation amount. The filtering of the pulse-width modulation signal can be completed by a low-pass filter.

Next, in step S370, the reference voltage is sent to the discharge circuit and the size of the output power is adjusted by the discharge circuit according to the change in the reference voltage.

In step S380, whether the discharge amount of the battery is sufficient is determined, wherein in step S380, whether the storage capacity of the battery is less than a second preset value can be determined to determine whether the discharge amount of the battery is sufficient. In particular, the second preset value can be 30% to 40% of the total storage capacity of the battery.

In step S380, when the storage capacity of the battery is determined to be less than the second preset value, the discharge amount of the battery is sufficient, and learning can be ended (step S390). Moreover, in step S380, when the storage capacity of the battery is determined to not be less than the second preset value, the discharge amount of the battery is insufficient, and step S340 is repeated and the discharge of the battery is sustained.

It should be mentioned that, when another power supply providing power to the load is present, the battery and another power supply can provide power to the load together or alternately for operation when the battery is learning. In other words, the load does not need to stop when the battery is learning, and normal operation can be maintained.

Figure 4:
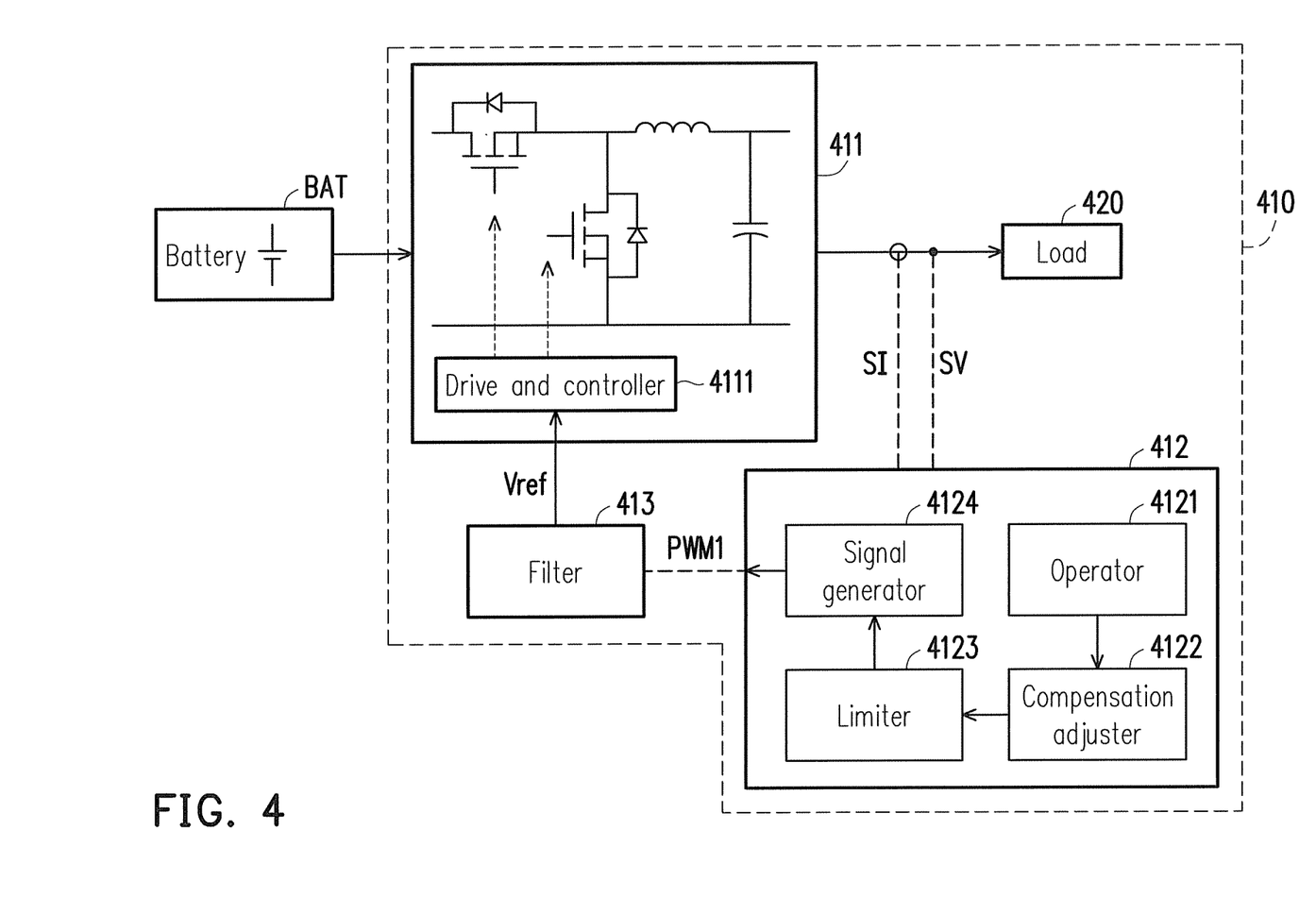
FIG. 4 shows a schematic of a battery management apparatus of an embodiment of the invention.

Referring to FIG. 4, FIG. 4 shows a schematic of a battery management apparatus of an embodiment of the invention. The battery management apparatus 410 is coupled to a battery BAT and a load 420. The battery management apparatus 410 includes a discharge circuit 411 and a controller formed by a core circuit 412 and a filter 413. The discharge circuit 411 is coupled to the load 420 and coupled to the filter 413. The core circuit 412 is coupled between the filter 413 and the load 420.

In the present embodiment, the core circuit 412 includes an operator 4121, a compensation adjuster 4122, a limiter 4123, and a signal generator 4124. In the power output mode, the core circuit 412 samples an output voltage SV and an output current SI via the output terminal of the discharge circuit 411. The operator 4121 receives the output voltage SV and the output current SI and performs calculations to calculate the output power, and calculates the comparison result of the output power and the target power. The compensation adjustor 4122 receives the comparison result and adjusts the unit compensation amount according to the comparison result. The compensation adjustor 4122 adjusts the resulting unit compensation amount to be sent to the limiter 4123. The limiter 4123 can make the value adjusted by the unit compensation amount not too large or too small and be limited in a certain range, and output the limited unit compensation amount to the signal generator 4124. The signal generator 4124 is used to generate the pulse-width modulation signal PWM1, wherein the signal generator 4124 controls the number of pulses in the unit time of the pulse-width modulation signal PWM1 according to the output of the limiter 4123.

The pulse-width modulation signal PWM1 is sent to the filter 413 and the filter 413 filters the pulse-width modulation signal PWM1 to generate the reference voltage Vref.

In the present embodiment, the operator 4121, the compensation adjuster 4122, the limiter 4123, and the signal generator 4124 can be formed by hardware circuits or completed via software executed by a processor. In terms of hardware implementation, for instance, the operator 4121 can include a multiplier (multiplying the output voltage SV and the output current SI), and the compensation adjuster 4122 can calculate the difference of the output power and the target power using a subtractor and find the compensation amount according to the difference via a built-in search table. The limiter 4123 can be formed via a comparator, and the signal generator 4124 can generate a triangular wave compared to the output of the limiter 4123 to generate the pulse-width modulation signal PWM1.

Of course, the hardware implementation of the operator 4121, the compensation adjuster 4122, the limiter 4123, and the signal generator 4124 is only exemplary, and is not intended to limit the scope of the invention.

Moreover, in the present embodiment, the discharge circuit 411 can be a DC-DC voltage transformer and include a drive and controller 4111. The drive and controller 4111 receives the reference voltage Vref and generates a control signal according to the reference voltage Vref to control transistor switching in the DC-DC voltage converter, so as to control the output power of the discharge circuit 411.

Figure 5:
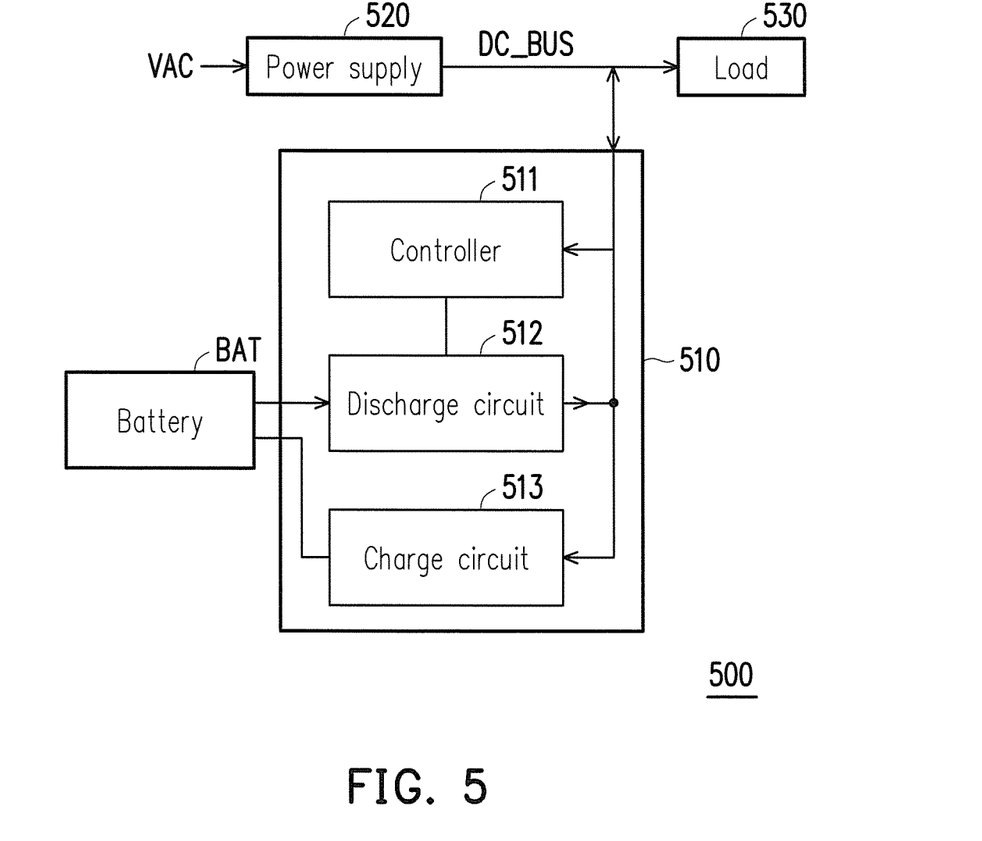
FIG. 5 shows a schematic of a power supply system built by a battery management apparatus according to an embodiment of the invention.

Referring to FIG. 5, FIG. 5 shows a schematic of a power supply system built by a battery management apparatus according to an embodiment of the invention. The power supply system 500 includes a battery BAT, a power management apparatus 510, and a power supply 520. The power supply 520 and the power management apparatus 510 are both coupled to a DC bus DC_BUS and provide power to a load 530. In particular, the power supply 520 can receive an AC power VAC (such as mains electricity) and perform AC-DC voltage conversion on the AC power VAC to generate DC power and provide the resulting DC power to the DC bus DC_BUS.

Moreover, the power management apparatus 510 includes a controller 511, a discharge circuit 512, and a charge circuit 513. The controller 511, the discharge circuit 512, and the charge circuit 513 are all coupled to the battery, and the controller 511, the discharge circuit 512, and the charge circuit 513 are all coupled to the DC bus DC_BUS.

Figure 6A:
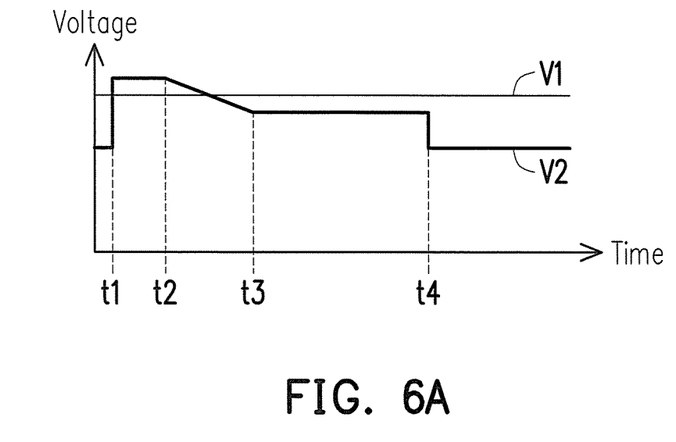
FIG. 6A to FIG. 6C show waveforms of a power supply system of an embodiment of the invention.
Figure 6B:
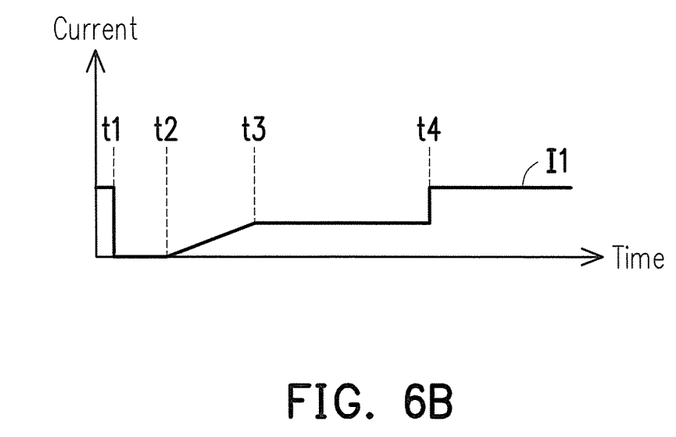
Figure 6C:
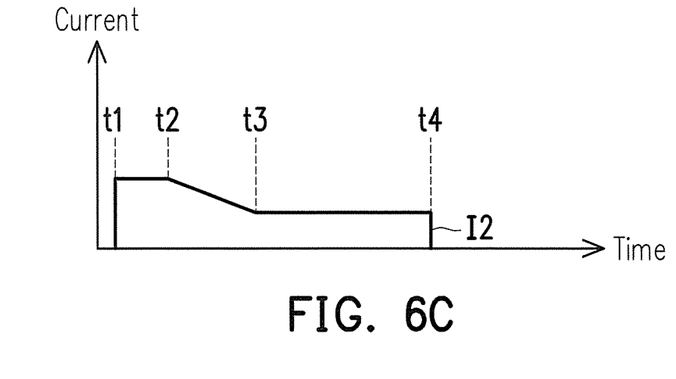

In the present embodiment, the discharge circuit 512 can receive the DC power provided by the battery and perform DC-DC voltage conversion, and provide the converted DC power to the DC bus DC_BUS. As a result, the power supply 520 and the power management apparatus 510 can provide power to the load 530 at the same time or separately in parallel. Regarding the details of the power supply of the power supply system 500, FIG. 6A to FIG. 6C show waveforms of a power supply system of an embodiment of the invention. In the embodiment of FIG. 6A to FIG. 6C, the output power needed for the load 530 is fixed.

Before a time point t1, the power supply 520 supplies power normally and provides a stable output voltage V1 (such as 12.5 V) to the load 530. At the same time, the power management apparatus 510 provides a relatively-low output voltage V2 (such as 12.3 V) to the load 530. Therefore, the power needed for the load 530 at this point is mainly provided by the power supply 520, and the power supply 520 provides a non-zero output current I1 and the power management apparatus 510 provides a zero output current I2.

Next, at the time point t1, the power management apparatus 510 enables the power output mode (learning mode) and increases the outputted voltage V2 to, for instance, 12.8 V (greater than the voltage V1) and discharges the battery BAT from the time point t1. Moreover, from the time point t1 to a time point t2, since the voltage V2 is greater than the voltage V1, the power needed for the load 530 at this point is mainly provided by the battery BAT. Therefore, the power supply 520 provides a zero output current I1 and the power management apparatus 510 provides a non-zero output current I2.

At the time point t2, the power management apparatus 510 puts the battery BAT in constant power discharge mode. Moreover, from the time point t2 to a time point t3, the power management apparatus 510 enables the compensation of the output power and adjusts the output power to reach a target power. In the present embodiment, the output power is greater than the target power, and therefore the compensation of the output power of the power management apparatus 510 reduces the value of the output current I2 to reduce the output power. At the same time, the output current I1 provided by the power supply 520 is increased to complement the output power of the battery reduced by the power management apparatus 510.

From the time point t3 to a time point t4, the output power of the battery BAT is adjusted to be equal to the target power, and therefore the output power generated by the battery BAT and the power supply 520 is constant. At the time point t4, the discharge of the battery BAT is complete and the power management apparatus 510 stops the battery BAT from discharging, and the power needed for the load 530 is provided by the power supply 520.

Of course, the output power needed for the load in the embodiments of the invention is not limited to be fixed and invariable. In actual application, the output power needed for the load can be adjusted with time or environmental temperature.

Based on the above, the battery management apparatus and the power output management method provided by the invention allow a battery to supply power to a load when the battery is discharged. In other words, when the battery is learning, the load can continue to operate without shutting down, thus increasing production efficiency. Moreover, in the invention, by compensating the output power step by step, ripples generated when the output power is adjusted can be effectively reduced, and therefore the quality of the power output is maintained.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A power output management method of a battery, comprising:
    enabling a power output mode and operating a discharge operation on the battery to a load via a discharge circuit coupled to the battery in the power output mode;
    calculating an output power of the discharge circuit during a time period of the discharge operation by a controller coupled to the discharge circuit;
    comparing the output power and a target power to generate a comparison result by the controller; and
    setting the output power being adjusted step by step by a unit compensation amount via the discharge circuit according to the comparison result.

2. The power output management method of claim 1, further comprising, before the power output mode is enabled:
    determining whether a storage capacity of the battery is greater than a first preset value and determining whether the battery is in a discharged state by the controller; and
    enabling the power output mode if the storage capacity of the battery is greater than the first preset value and the battery is not in the discharged state.

3. The power output management method of claim 2, further comprising:
    determining whether the storage capacity of the battery is less than a second preset value in the power output mode by the controller, and ending the power output mode by the controller when the storage capacity of the battery is less than the second preset value.

4. The power output management method of claim 1, wherein step of calculating the output power of the discharge circuit during a time period of the discharge operation comprises:
    sampling an output voltage and an output current of the discharge circuit; and
    calculating the output power of the discharge circuit according to the output voltage and the output current.

5. The power output management method of claim 1, wherein step of comparing the output power and the target power to generate the comparison result and adjusting the output power step by step via the discharge circuit according to the unit compensation amount and the comparison result comprises:
    calculating a difference of the output power and the target power;
    setting the unit compensation amount according to the difference;
    increasing or decreasing one of the unit compensation amounts step by step via the output power when the difference is greater than a critical value; and
    stopping the adjustment of the output power when the difference is not greater than the critical value.

6. The power output management method of claim 5, wherein step of enabling the power output mode and operating the discharge operation on the battery to the load via the discharge circuit in the power output mode comprises:
    generating a reference voltage according to a pulse-width modulation signal; and
    performing the discharge via the discharge circuit according to the reference voltage,
    wherein the discharge makes the output power generated by the discharge circuit being direct proportion to a number of pulses of a unit time of the pulse-width modulation signal.

7. The power output management method of claim 6, wherein when the difference is greater than the critical value, step of increasing or decreasing one of the unit compensation amounts step by step via the output power comprises:
    increasing or decreasing a unit preset value of the number of pulses of the unit time of the pulse-width modulation signal when the difference is greater than the critical value.

8. A battery management apparatus, comprising:
    a discharge circuit coupled to a battery and coupled to a DC bus, wherein the DC bus is coupled to a load, and the discharge circuit operates a discharging operation on the battery to the load in a power output mode; and
    a controller coupled to the discharge circuit, wherein the controller calculates an output power of the discharge circuit during a time period of the discharge operation and compares the output power and a target power to generate a comparison result, and sets the output power being adjusted step by step by a unit compensation amount via the discharge circuit according to the comparison result.

9. The battery management apparatus of claim 8, wherein the controller determines whether a storage capacity of the battery is greater than a first preset value and determines whether the battery is in a discharged state, and enables the power output mode when the storage capacity of the battery is greater than the first preset value and the battery is not in the discharged state.

10. The battery management apparatus of claim 9, wherein the controller determines whether the storage capacity of the battery is less than a second preset value in the power output mode, and ends the power output mode when the storage capacity of the battery is less than the second preset value.

11. The battery management apparatus of claim 8, wherein the controller samples an output voltage and an output current of the discharge circuit during the discharge and calculates the output power of the discharge circuit according to the output voltage and the output current.

12. The battery management apparatus of claim 8, wherein the calculator controller calculates a difference of the output power and the target power and sets the unit compensation amount according to the difference, when the difference is greater than a critical difference, the controller makes the output power increase or decrease one of the unit compensation amounts step by step, and when the difference is not greater than the critical difference, the adjustment of the output power is stopped.

13. The battery management apparatus of claim 12, wherein the controller generates a reference voltage according to a pulse-width modulation signal and makes the discharge circuit discharge according to the reference voltage, wherein the discharge makes the output power generated by the discharge circuit being direct proportion to a number of pulses of a unit time of the pulse-width modulation signal.

14. The battery management apparatus of claim 13, wherein the controller generates the reference voltage for the pulse-width modulation signal.

15. The battery management apparatus of claim 13, wherein when the difference is greater than the critical difference, the controller increases or decreases a unit preset value of the number of pulses of the unit time of the pulse-width modulation signal.

16. The battery management apparatus of claim 13, wherein the controller comprises:
    a core circuit calculating the output power of the discharge circuit during the discharge, comparing the output power and the target power to generate the comparison result, and adjusting the pulse-width modulation signal according to the comparison result; and
    a filter coupled to the core circuit and the discharge circuit and filtering the pulse-width modulation signal to generate the reference voltage.

17. The battery management apparatus of claim 16, wherein the core circuit comprises:
    an operator calculating the output power according to the output voltage and the output current and calculating the comparison result;
    a compensation adjuster coupled to the operator and adjusting the unit compensation amount according to the comparison result;
    a limiter coupled to the compensation adjuster and limiting a value of the unit compensation amount in a range; and
    a signal generator coupled to the limiter and adjusting the pulse-width modulation signal according to the unit compensation amount.

18. The battery management apparatus of claim 8, further comprising:
    a charging circuit coupled to the battery and coupled to the DC bus to charge the battery.

* * * * *